(12) United States Patent
Venkatraman et al.

(10) Patent No.: US 9,247,381 B2
(45) Date of Patent: Jan. 26, 2016

(54) SYSTEM, METHOD AND DEVICES FOR DELIVERING POSITIONING ASSISTANCE DATA

(71) Applicant: QUALCOMM Incorporated, San Diego, CA (US)

(72) Inventors: Sai Pradeep Venkatraman, Santa Clara, CA (US); Thanh Le Nguyen, Sunnyvale, CA (US); Gengsheng Zhang, Cupertino, CA (US); Weiyi Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/224,027

(22) Filed: Mar. 24, 2014

(65) Prior Publication Data

US 2015/0271632 A1 Sep. 24, 2015

(51) Int. Cl.
| | |
|---|---|
| *H04W 24/00* | (2009.01) |
| *H04W 4/02* | (2009.01) |
| *H04W 24/08* | (2009.01) |
| *G01C 21/20* | (2006.01) |
| *G01S 19/48* | (2010.01) |

(52) U.S. Cl.
CPC .............. *H04W 4/02* (2013.01); *G01C 21/206* (2013.01); *G01S 19/48* (2013.01); *H04W 24/08* (2013.01); *H04W 4/021* (2013.01)

(58) Field of Classification Search
CPC ....... H04W 4/02; H04W 4/021; H04W 24/08; G01C 21/206; G01S 19/48
USPC ...................... 455/456.6, 456.1, 456.2, 456.5
See application file for complete search history.

(56) References Cited

U.S. PATENT DOCUMENTS

| 7,024,195 B2 | 4/2006 | Miriyala et al. | |
|---|---|---|---|
| 8,587,476 B2 | 11/2013 | Hung et al. | |
| 2010/0211308 A1* | 8/2010 | Zheng | G01C 21/20 701/533 |
| 2011/0177825 A1 | 7/2011 | Huang | |
| 2012/0028649 A1* | 2/2012 | Gupta et al. | 455/456.1 |
| 2012/0028654 A1* | 2/2012 | Gupta | H04W 4/04 455/456.3 |
| 2012/0150434 A1 | 6/2012 | Cho et al. | |
| 2013/0095849 A1* | 4/2013 | Pakzad | H04W 64/00 455/456.1 |
| 2013/0102334 A1 | 4/2013 | Khorashadi et al. | |
| 2013/0310064 A1 | 11/2013 | Brachet et al. | |

FOREIGN PATENT DOCUMENTS

WO WO-2013108043 A2 7/2013

OTHER PUBLICATIONS

Partial International Search Report—PCT/US2015/022077—ISA/EPO—Jun. 29, 2015.
International Search Report and Written Opinion—PCT/US2015/022077—ISA/EPO—Sep. 8, 2015.

* cited by examiner

*Primary Examiner* — Khai M Nguyen
(74) *Attorney, Agent, or Firm* — Berkeley Law & Technology Group, LLP

(57) ABSTRACT

Disclosed are systems, methods and devices for providing positioning assistance data to a mobile device. In a particular implementation, a mobile device may receive parameters representing an inference model. The mobile device may then apply observations to the inference model to classify the location of the mobile device as being in a particular region. The mobile device may then request positioning assistance data based, at least in part, on the particular region.

25 Claims, 10 Drawing Sheets

| Time | Offset | | | | | IN |
|---|---|---|---|---|---|---|
| | -10 | -5 | 0 | +5 | +10 | |
| 1 | OUT | OUT | OUT | OUT | IN | 0.2 |
| 2 | OUT | OUT | OUT | OUT | IN | 0.2 |
| 3 | OUT | OUT | OUT | OUT | IN | 0.2 |
| 4 | OUT | OUT | OUT | IN | IN | 0.4 |
| 5 | OUT | IN | IN | IN | IN | 0.8 |

FIG. 5

SYSTEM, METHOD AND DEVICES FOR DELIVERING POSITIONING ASSISTANCE DATA

BACKGROUND

1. Field

Embodiments described herein are directed to mobile positioning and/or navigation techniques.

2. Information

Global positioning system (GPS) and other like satellite positioning systems (SPSs) have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from indoor signals received from such access points and measuring one or more characteristics of signals received from such access points such as, for example, signal strength, round trip delay, just to name a few examples.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 5 and 6 illustrate aspects of a probabilistic predictor according to an embodiment.

SUMMARY

Figure 1:
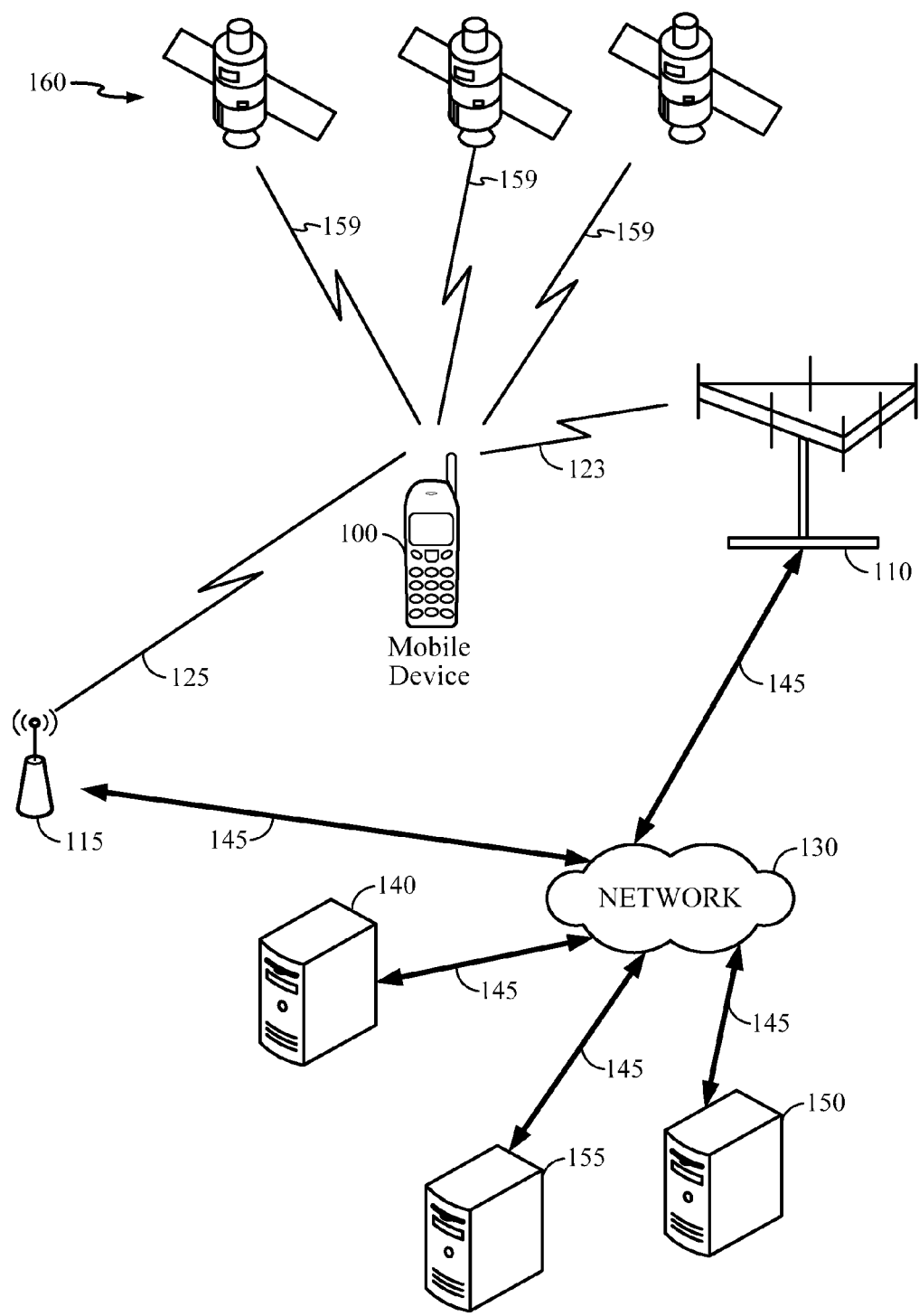
FIG. 1 is a system diagram illustrating certain features of a system containing a mobile device, in accordance with an implementation.

Briefly, particular implementations are directed to a method comprising, at a mobile device: transmitting one or more indicators of a location of the mobile device to a server; receiving from the server parameters representing an inference model based, at least in part, on the one or more indicators of the location; determining that the mobile device is located in or approaching a particular region of a plurality of candidate regions based, at least in part, on application of one or more observations obtained by the mobile device to the parameters representing the inference model; transmitting a request message to the server indicating that the mobile device is located in or approaching the particular region; and receiving the server positioning assistance data determined based, at least in part, on the request message.

Another particular implementation is directed to a mobile device comprising: a wireless transceiver device to wirelessly transmit messages to and wirelessly receive messages from a wireless communication network; and one or more processors to: initiate transmission of one or more messages through the wireless transceiver device comprising one or more indicators of a location of the mobile device to a server; obtain one or more messages received from the server at the transceiver device comprising parameters representing an inference model based, at least in part, on the one or more indicators of the location; determine that the mobile device is located in or approaching a particular region of a plurality of candidate regions based, at least in part, on application of one or more observations obtained by the mobile device to the parameters representing the inference model; initiate transmission of a request message through the transceiver device to the server indicating that the mobile device is located in or approaching the particular region; and obtain one or more messages received from the server at the transceiver device comprising positioning assistance data determined based, at least in part, on the request message.

Another particular implementation is directed to an article comprising: a storage medium comprising machine-readable instructions stored thereon which are executable by one or more processors to: initiate transmission of one or more messages comprising one or more indicators of a location of the mobile device to a server; obtain one or more messages from the server received at the wireless transceiver device comprising parameters representing an inference model based, at least in part, on the one or more indicators of the location; determine that the mobile device is located in or approaching a particular region of a plurality of candidate regions based, at least in part, on application of one or more observations obtained by the mobile device to the parameters representing the inference model; initiate transmission of a request message to the server indicating that the mobile device is located in or approaching the particular region; and obtain one or more messages from the server at that wireless transceiver device comprising positioning assistance data determined based, at least in part, on the request message.

Another particular implementation is directed to a mobile device comprising: means for transmitting one or more indicators of a location of the mobile device to a server; means for receiving from the server parameters representing an inference model based, at least in part, on the one or more indicators of the location; means for determining that the mobile device is located in or approaching a particular region of a plurality of candidate regions based, at least in part, on application of one or more observations obtained by the mobile device to the parameters representing the inference model; means for transmitting a request message to the server indicating that the mobile device is located in or approaching the particular region; and means for receiving from the server positioning assistance data determined based, at least in part, on the request message.

It should be understood that the aforementioned implementations are merely example implementations, and that claimed subject matter is not necessarily limited to any particular aspect of these example implementations.

DETAILED DESCRIPTION

In particular implementations, a navigation engine of a mobile device may process measurements while a mobile device is in one particular operating environment differently than if the mobile device was in a different environment. In an outdoor environment, for example, a navigation engine may use a Kalman filter to estimate and/or predict navigation states based, at least in part, on pseudorange measurements obtained from acquisition of satellite position system (SPS) signals. In an indoor environment, for example, a navigation engine may use a particle filter to estimate and/or predict navigation states based, at least in part, on measurements of characteristics of indoor signals acquired at a mobile device.

As a mobile device travels throughout different navigable regions, from time to time a navigation engine may similarly transition between application of associated approaches for processing signals to estimate and/or predict navigation states. If transitioning between an indoor environment and an outdoor environment, for example, a navigation engine of a mobile device may similarly transition between attempting position fixes by acquiring SPS signals and attempting to acquire signals from indoor transmitters (e.g., IEEE std. 802.11 access points (APs)) to estimate and/or predict navigation states. However, there is typically no well-defined technique for determining an optimal condition for transitioning between use of SPS signals and use of WiFi signals in positioning operations. Also, abrupt transitions between use of different filtering techniques may induce abrupt "jumps" in an estimated and/or predicted navigation state.

According to an embodiment, a mobile device may contact a server to obtain positioning assistance data for use in an indoor navigation environment. Such a request from the mobile device may include, for example, an indication of a rough location of the mobile device which is determined to be in the area. The requested positioning assistance data may include, for example, a digital map for a local area in which the mobile device is located, locations of transmitters for use in positioning operations, radio heatmap data, routeability graphs, probability heatmap data, just to name a few examples of positioning assistance data.

In a particular embodiment, a positioning server may store and associate location context identifiers (LCIs) with specific "location contexts." Such a location context may include locally defined areas such as, for example, particular floors of buildings or other indoor areas which are not mapped according to a global coordinate system. LCIs may be used as handles for requesting additional information laid over such a location context such as, for example, routes or paths over an indoor map, points of interest which are local or unique to location contexts, just to name a couple of examples.

According to an embodiment, a mobile device moving into an area may contact a positioning server to obtain one or more LCIs associated with the area. To obtain an LCI that is covering or is relevant to a particular area, the mobile device may first receive information from local transmitters that is indicative of and/or representative of the particular area. For example, the mobile device may obtain MAC identifiers (MAC IDs) from signals transmitted from one or more WiFi access points and/or received signal strength indications (RSSIs) related to same. Alternatively, the mobile device may receive signals transmitted from a satellite positioning system such as GPS and/or information from an application programming interface capable of providing location information, for example. The mobile device may then wirelessly communicate with the positioning server to request one or more LCIs associated with the area in question by providing location information as discussed above (e.g., MAC IDs, RSSI and/or other location information). The positioning server may then use such information received from the mobile device to determine a location context (e.g., the floor of a building or other indoor space), and respond to the request by providing one or more LCIs associated with the determined location context.

According to an embodiment, a mobile device may transmit one or more parameters indicative of a location of the mobile device to a server. As point out above, these parameters may include, for example, indications of a rough location of the mobile device. In response to receipt of the one more parameters, the server may provide additional parameters indicative of a particular inference model to assist the mobile device in classifying a location of the mobile device as being in a particular region of multiple predefined candidate regions. The mobile device may then apply measurements obtained at the mobile device to the parameters indicative of the inference model to infer whether the mobile device is in a particular region of a plurality of candidate regions. The mobile device may then transmit a request message to the server indicating the inference that said mobile device is located in or approaching the particular environment and receive positioning assistance data determined based, at least in part, on the inference.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, the mobile device 100 may transmit radio signals to, and receive radio signals from, a wireless communication network. In one example, mobile device may communicate with a cellular communication network by transmitting wireless signals to, or receiving wireless signals from, a base station transceiver 110 over a wireless communication link 123. Similarly, mobile device 100 may transmit wireless signals to, or receive wireless signals from a local transceiver 115 over a wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 150. In another implementation, network 130 may comprise cellular communication network infrastructure such as, for example, a base station controller or master switching center (not shown) to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI), round trip time (RTT) or angle of arrival (AOA). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAD address which is discernible from a signal acquired from a local transmitter), expected RSSI from signals transmitted by the identified local transmitters, an expected RTT from the identified transmitters, and possibly standard deviations from these expected RSSI or RTT. A radio heatmap may define gridpoints (e.g., at a set spacing) at discrete locations over an area of interest (e.g., over an area covered by an LCI). At any particular gridpoint a radio heatmap may associate expected signature values for signals transmitted by one or more known APs. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples. Other positioning assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor positioning assistance data through servers 140, 150 or 155 by, for example, requesting the indoor assistance data through selection of a universal resource locator (URL). In particular implementations, servers 140, 150 or 155 may be capable of providing indoor positioning assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor positioning assistance data for all areas served by servers 140, 150 or 155 impractical or infeasible, a request for indoor positioning assistance data from mobile device 100 may indicate a rough or course estimate of a location of mobile device 100. Mobile device 100 may then be provided indoor positioning assistance data covering areas including and/or proximate to the rough or course estimate of the location of mobile device 100.

As pointed out above, a request for indoor positioning assistance data from mobile device 100 may specify a location context identifier (LCI). Such an LCI may be associated with a locally defined area such as, for example, a particular floor of a building or other indoor area which is not mapped according to a global coordinate system. In a particular implementation, regions covered by multiple distinct LCIs may be distinct or overlapping. In one example server architecture, upon entry of an area, mobile device 100 may request a first server, such as server 140, to provide one or more LCIs covering the area or adjacent areas. Here, the request from the mobile device 100 may include a rough location of mobile device 100 such that the requested server may associate the rough location with areas covered by known LCIs, and then transmit those LCIs to mobile device 100. Mobile device 100 may then use the received LCIs in subsequent messages with a different server, such as server 150, for obtaining positioning assistance data relevant to an area identifiable by one or more of the LCIs as discussed above (e.g., digital maps, locations and identifies of beacon transmitters, radio heatmaps or routeability graphs).

As pointed out above, a location server may provide mobile device 100 with positioning assistance tailored to a particular region where mobile device 100 is expected to be located within or approaching. As such, it may be useful in infer that mobile device 100 as being located within or approaching a particular region. In an example implementation, mobile device 100 may transmit one or more messages containing one or more parameters indicative of a location of mobile device 100 to a location server (e.g., server 140, 150 or 155). In response mobile device 100 may receive parameters of an inference model that enables mobile device 100 to classify location as being within or approaching a particular region of a plurality of predetermined regions. Mobile device 100 may then make a subsequent request for positioning assistance data covering the particular region.

Figure 2:
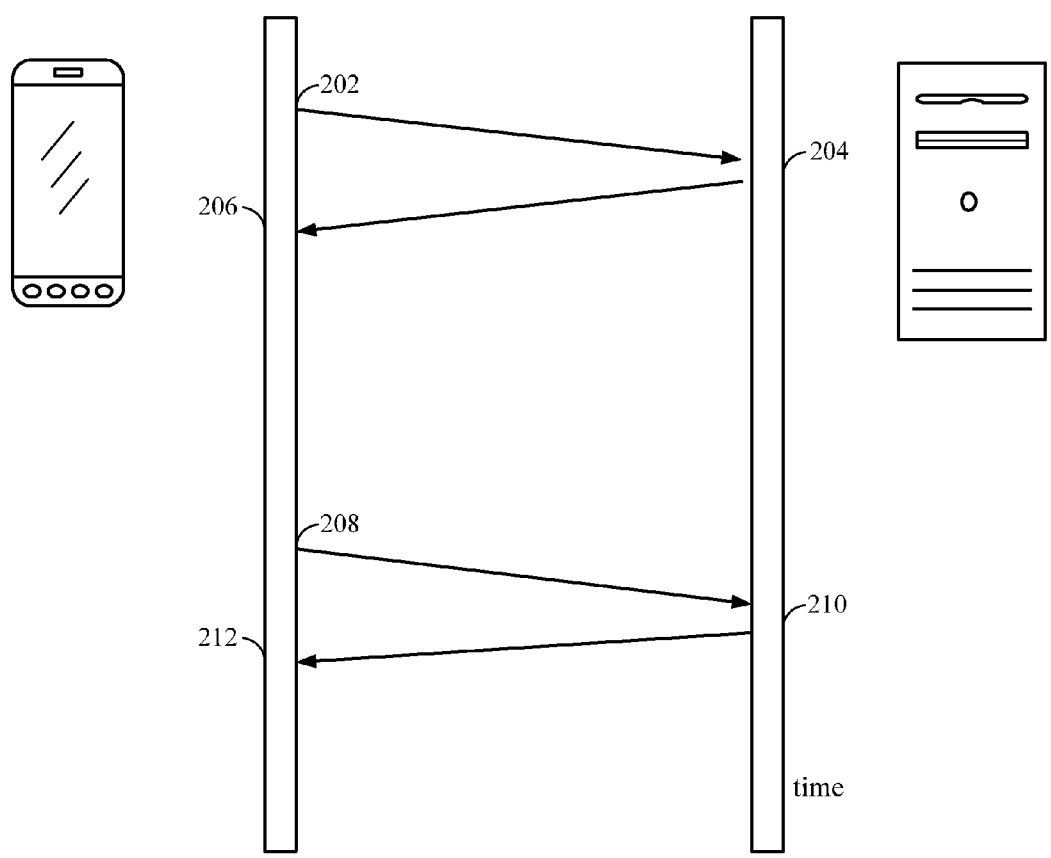
FIG. 2 is a diagram illustrating a message flow according to an embodiment.
Figure 3:
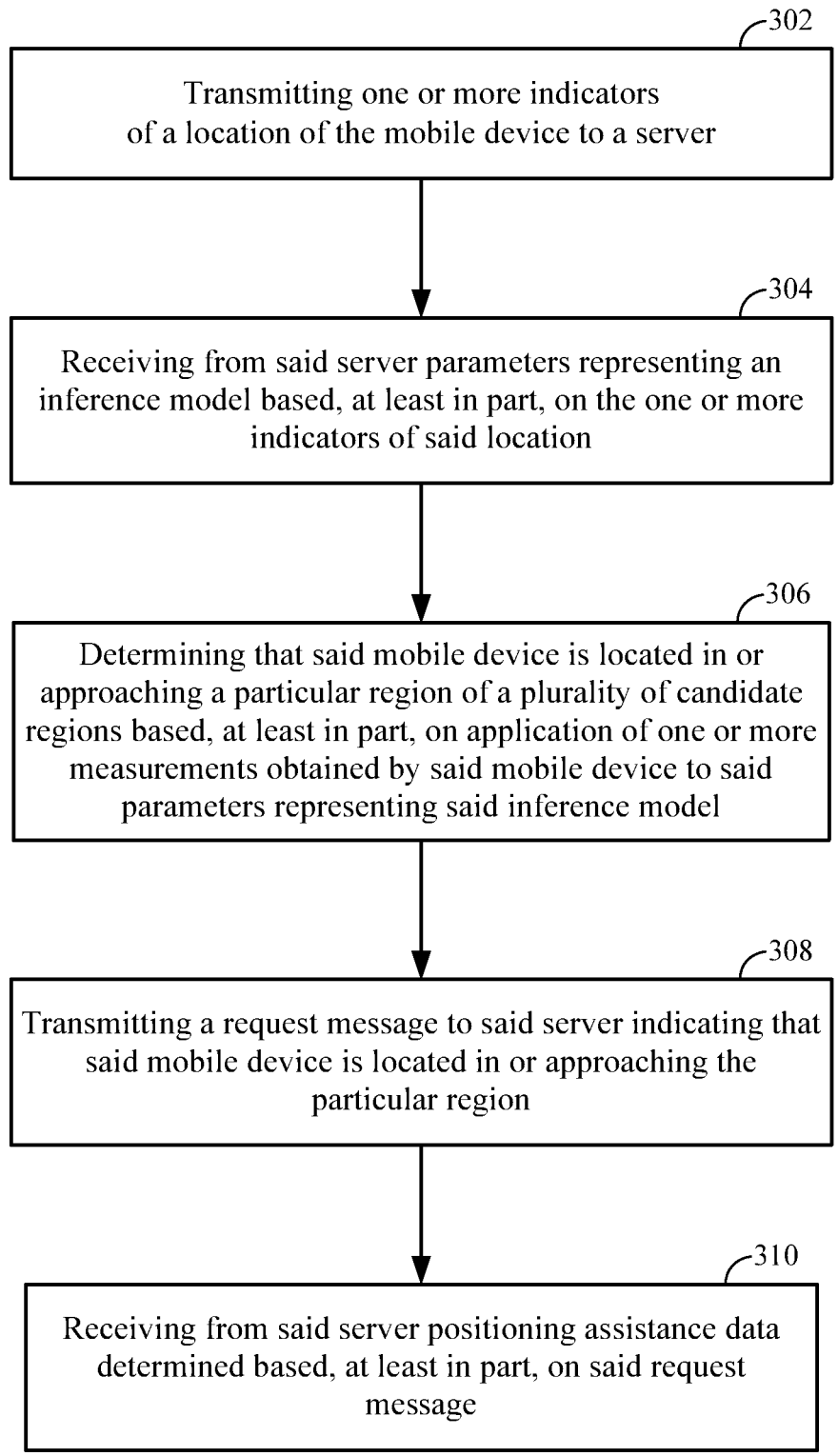
FIG. 3 is a flow diagram illustrating process for obtaining positioning assistance data according to an embodiment.

FIG. 2 is an exemplary message flow diagram illustrating a sequence of messages transmitted between a mobile device and a server according to an embodiment. FIG. 3 is a flow diagram of an exemplary process that may be executed at the mobile device in connection with the sequence of messages shown in FIG. 2. It should be understood, however, that actions performed as set forth in FIG. 3 may not necessarily be restricted by details set forth in connection with FIG. 2. At time 202, a mobile device may transmit one or more messages to a server comprising parameters indicative of a location of the mobile device. For example, at block 302, the mobile device may, in connection with receiving positioning assistance data, transmit one or more messages to the server comprising, for example, a most recently obtained SPS position fix, MAC addresses obtained from local signals acquired at the mobile device, parameters derived from a user input or images captured at a digital camera, signal strength measurements, measurements obtained by environmental sensors, just to provide a examples.

At time 204, a server may receive messages transmitted at time 202 and, in response, transmit one or more messages to the mobile device comprising parameters indicative of an inference model. These parameters indicative of the inference model may enable the mobile device to classify its location as being located in or approaching a particular region of a plurality of candidate regions. For example, as discussed below, an inference model enabling the mobile device to infer a particular region including the location of the mobile device may include any one of several classification or prediction models, such as, for example, support vector machine (SVM), decision tree logic, indoor/outdoor decision logic, Bayes classification, Naïve Bayes classification, just to name a few examples. Based, at least in part, on measurements or information obtained at the mobile device, the parameters indicative of an inference model may enable the mobile device to accurately classify its location as being within or approaching a particular region of a plurality of candidate regions. For example, the mobile device may infer that its location is an indoor area, outdoor area, in an indoor area approaching an outdoor area or in an outdoor area approaching an indoor area. If the mobile device infers that its location is in an outdoor area, for example, the mobile device may attempt to obtain a position fix by acquiring SPS signals. On the other hand, if the mobile device infers that its location is in an indoor area, the mobile device may attempt to determine an estimate of its location using one or more of the indoor positioning techniques discussed above. Alternatively, the parameters indicative of the inference model may enable the mobile device to infer that its location is located within or approaching a particular region covered by a particular LCI, or transitioning between areas covered by different LCIs, etc. This may allow the mobile device to efficiently request and obtain positioning assistance data tailored to an area covered by the particular LCI.

At time 206, the mobile device may receive one or more messages comprising parameters representing, characterizing, corresponding to, relating to and/or indicative of an inference model transmitted from the server at time 204. This is illustrated in an example embodiment at block 304 of FIG. 3. Based, at least in part on the parameters received at time 206 and observations obtained at the mobile device, the mobile device may formulate a request message transmitted at time 208 requesting positioning assistance data covering the particular region that the mobile device is inferred to be located in or approaching. Transmission of the request message at time 208 may occur according to block 308 of FIG. 3, for example. In response to receipt of the request messages at time 210, the server may transmit one or more messages at time 210 containing the requested positioning assistance data covering the region that is inferred to contain or predicted to contain the location of the mobile device.

For simplicity, FIG. 2 shows a single server device that exchanges messages with a mobile device at times 204 and 210. It should be understood, however, that a single "server" may be implemented as two different devices where a first device exchanges messages with the mobile device at time 204 and a second device exchanges messages with the mobile device at time 210. The two different devices may even comprise different physical addresses and/or network addresses, and that claimed subject matter is not limited in this respect.

According to an embodiment in block 306, between times 206 and 208 a mobile device may apply observations obtained by the mobile device to parameters of an inference model to classify the mobile device's location as being in or approaching a particular region (e.g., indoor versus outdoor region or in an area covered by a particular LCI). An inference that a mobile device's location is in a particular region may entail a determination that an estimated location of the mobile device is in the particular regions with a high likelihood (e.g., more likely than not). An inference that a location of a mobile device is approaching a particular region may comprise, for example, a determination that the location of the mobile device is transitioning to being in the particular region. For example, an estimate of a location of a mobile device accompanied with a velocity vector may indicate that that the mobile device is likely to be located in the particular region in the near future. In another example, an observed trend may indicate that the mobile device is likely to be located in the particular regions (e.g., location in addition to observed past behavior and/or habit). Observations applied to parameters of the inference model may include, for example, any observations obtained by the mobile device prior to time 208 including, for example, RTT or RSSI measurements from signals acquired from local access points (e.g., IEEE std. 802.11 or Bluetooth®), most recent SPS position fixes, measurements obtained from inertial or environmental sensors, camera images, just to provide a few examples of observations that may be applied to an inference model. In one implementation, the received parameters indicative of an inference model received at block 304 may include a list of MAC addresses of APs for each of the LCIs and parameters indicative of an inference model applicable to the LCIs. In one example application, a mobile device may simply acquire signals transmitted from one or more APs serving an area covered by an LCI to classify the location of the mobile device as being in the area covered by the LCI. In other words, by acquiring a signal having a MAC address identifying an AP serving a particular area covered by an LCI, it may be inferred that the mobile device is located in the particular area. It should be understood, however, that these are merely examples of parameters that may represent, indicate, relate to, correspond to or otherwise characterize an inference model, and claimed subject matter is not limited in this respect.

Parameters indicative of an inference model transmitted from a server to a mobile device may consume an increasing quantity of resources (e.g., memory capacity, message transmission bandwidth, battery resources, etc.) based, at least in part, on a size or scale of the inference model. Such a size and scale may be determined by, for example, a number of features to be evaluated in a classification process. Accordingly, reducing a number of features to those that are most reliable or determinative may reduce impacts on mobile device processing without significantly sacrificing performance of the inference model.

As discussed herein, at block 306 a mobile device may apply observations (e.g., RSSI or RTT measurements) to an inference model to infer that the mobile device is located in or outside of a particular LCI, or predict whether the mobile device is transitioning into or outside of a particular LCI. This may be determined based, at least in part, on observations applied from a single epoch in time or a sequence of observations by modeling a motion state of the mobile device (e.g., using a Kalman filter or particle filter). As pointed out below in a particular implementation, expected signature values in an RSSI heatmap may be processed to formulate a set of rules that may be applied to observations and/or a modeled motion state to infer or predict a classification of the location of the mobile device (e.g., indoor, outdoor, in a particular LCI, etc.).

Figure 4:
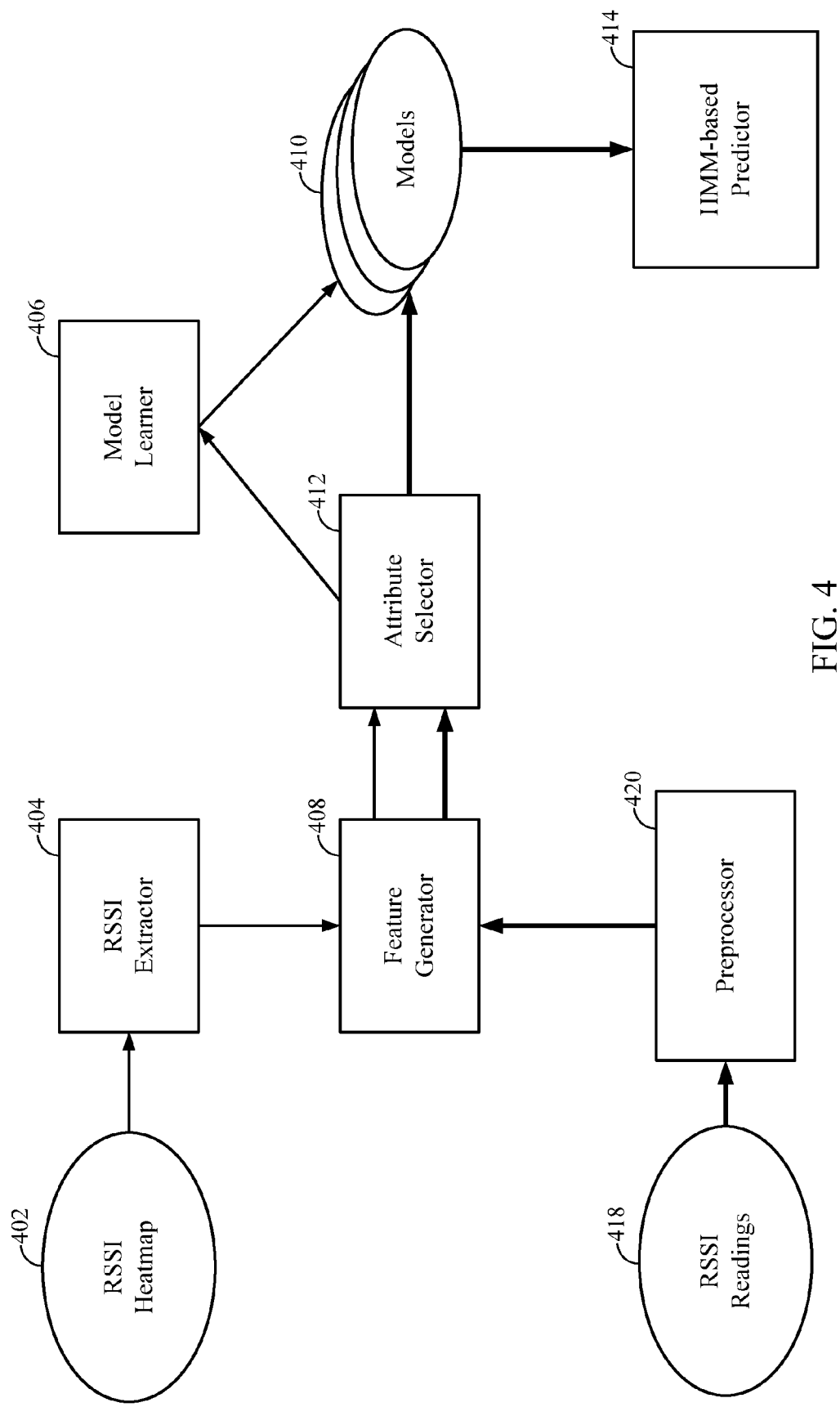
FIG. 4 is a flow diagram of a process for determining parameters of an inference model according to an embodiment.

According to an embodiment, parameters indicative of an inference model transmitted by a server at time 204 may be derived in an "off-line" or learning phase in which classification attributes and features may be defined. Such an inference model may enable a mobile device to classify a location of the mobile device as being in or approaching a particular region (e.g., indoor versus outdoor or one of multiple LCIs) as discussed above. FIG. 4 is a flow diagram of a process for generating parameters indicative of an inference model to be applied by a mobile device in determining whether the mobile device is located within or approaching a particular region as discussed above. Actions and processes set forth in FIG. 4 may be performed by a computing platform such as a server (e.g., server 140, 150 or 155). In this particular example implementation, such parameters of an inference model may comprise a heatmap model (HMM)-based predictor 414. It should be understood, however, that this is merely an example of parameters indicative of an inference model according to a particular embodiment, and claimed subject matter is not limited in this respect.

In the particular illustrated example, an RSSI extractor 404 may process RSSI heatmap values 402 to provide extracted RSSI features. As pointed out above, RSSI heatmap values 402 may comprise expected RSSI signature values referenced to particular points covering an area (e.g., grid points covering the area). Preprocessor 420 may process RSSI readings or measurements 418 (e.g., obtained from crowdsourced mobile device observations) to provide inputs for features generator 408. RSSI readings or measurements 418 may be paired or referenced to ground-truth measurements of location contemporaneous with the obtained RSSI readings or measurements. Based, at least in part, on extractions from RSSI extractor 404 and preprocessed RSSI readings from preprocessor 420, feature generator 408 may provide attributes representative of features that may be selected by attribute selector 412 to be used in an inference model. Attribute selector may select the most reliable attributes to be incorporated into a classification model, and omit attributes leading to unreliable or spurious classifications. According to an embodiment, RSSI extractor 404 may extract features of gridpoints defined in a radio heatmap. In one implementation, a particular gridpoint location may be classified as being in a particular region such as indoor or outside. It should be understood, however, that this is merely an example of features that may be extracted for use classifying locations of a mobile device, and claimed subject matter is not limited in this respect.

As discussed herein in particular implementations, APs are not limited to IEEE std. 802.11 APs but may also include Bluetooth® transceivers or femtocell transceivers, for example. In a particular scenario APs may be located in an indoor environment, a mobile receiver outside of such an indoor environment may still detect, acquire and measure signals that are transmitted from the indoor APs. However, the strength of signals received and acquired in the outdoor environment may be significantly lower. In a particular implementation, a location may be classified as being indoor or outdoor based, at least in part, on the strength of signals received from particular APs at the location. In a particular example presented for the purpose of illustration, Table 1 below shows example features extracted by RSSI extractor 404 for gridpoints including an expected RSSI signature value from a signal transmitted by a particular access point (show as AP1, AP2 or AP3) and classification of the locations of the gridpoints.

TABLE 1

| AP1 (dB) | AP2 (dB) | AP3 (dB) | Classification |
|---|---|---|---|
| −90 | −95 | −85 | Outside |
| −75 | −70 | −95 | Outside |
| −45 | −35 | −55 | Inside |

In the particular example above, it may be observed that the expected strength of signals received from AP1, AP2 and AP3 at a gridpoint known to be in an inside environment is substantially higher than the expected strength of signals received at a gridpoint known to be in an outside environment. To complement features shown in Table 1, preprocessor 420 may extract additional features from RSSI readings 418 as summarized in Table 2 below.

TABLE 2

| #APs above −90 dB | # APs above −70 dB | Classification |
|---|---|---|
| 1 | 0 | Outside |
| 2 | 0 | Outside |
| 3 | 3 | Inside |

Here, threshold signal strengths are set at −70 dB and −90 dB. It should be understood, however, that these are merely example thresholds that may be applied and that claimed subject matter is not limited in this respect. At particular locations known to be in inside or outside, a number of signals having a received signal strength at the threshold levels may be counted. Based, at least in part, on a count of acquired signals having a received signal strength above certain thresholds, the location of the mobile device may be classified as being in an inside region or an outside region.

Particular examples of inference models above may classify a location of a mobile device as being with a region distinct from other regions (e.g., indoor versus outdoor, in one particular LCI versus another). In one alternative implementation, however, an inference model may compute a likelihood or probability that a mobile device is located within or approaching a particular area (e.g., probability or likelihood that the mobile device is in an indoor environment or located within a particular LCI).

In particular implementations, expected signature values in an RSSI radio heatmap may presume a particular transmission power applied at an AP to transmit signals in question which may deviate from a transmission power actually applied by the AP in the field. Additionally, in particular implementations, different mobile device receivers may apply different gains to signals acquired from local APs. As such, RSSI values of a signal acquired by different mobile device receivers at the same location may vary based, at least in part, on different receiver gains applied by the different mobile device receivers. Here, a variation in gain applied at mobile receiver and/or variation in transmission power (and other factors such as an incorrect propagation model used for computing expected RSSI heatmap signature values, multipath or misplaced APs) may contribute to an "offset" between measured RSSI and an expected RSSI signature value in a radio heatmap for a particular location. In a particular implementation, over time a mobile device may estimate such an offset (e.g., based, on ground truth observations and comparisons of measured RSSI to expected RSSI signature values in a radio heatmap) and cache the offset for future application of measured RSSI to expected RSSI signature values.

In another implementation, an offset for a particular mobile device and particular AP may be estimated prior to entry of the particular mobile device to an indoor venue. Prior to entering a building, for example, a mobile device may obtain an accurate GNSS position fix within an area covered by an LCI (e.g., an LCI having coverage extending to an outdoor portion). Contemporaneous with obtaining the position fix, the mobile device may acquire a signal transmitted by the particular AP to measure an RSSI. The mobile device may transmit one or more messages to a server containing the measured RSSI and estimated location of the mobile device as determined by the GNSS position fix. The server may then compare the measured RSSI with an expected RSSI signature from the radio heatmap (e.g., extrapolated or interpolated from an RSSI heatmap gridpoint to the estimated location determined by the position fix) to compute a difference as a receiver gain or offset value. The computed receiver gain or offset value may then be transmitted in a return message from the server to the mobile device. The mobile device may then employ the receiver gain or offset together with classifiers as discussed herein (e.g., to detect transitions between indoors and outdoors).

It may be observed that uncertainty in offsets in measured RSSI from an expected RSSI signature value in a radio heatmap may affect certainty or accuracy in inferences of a classification of a mobile device as being in or approaching a region of interest. In one implementation, a location of a mobile device may be classified as being inside (or indoor), outside (or outdoor), or border (e.g., not conclusively inside or outside). According to an embodiment, a probabilistic inference model may condition an inference as to whether a mobile device is located in an indoor region or an outdoor region based, at least in part, on a receiver gain or "offset" applied to an acquired signal for measuring RSSI.

Figure 6:
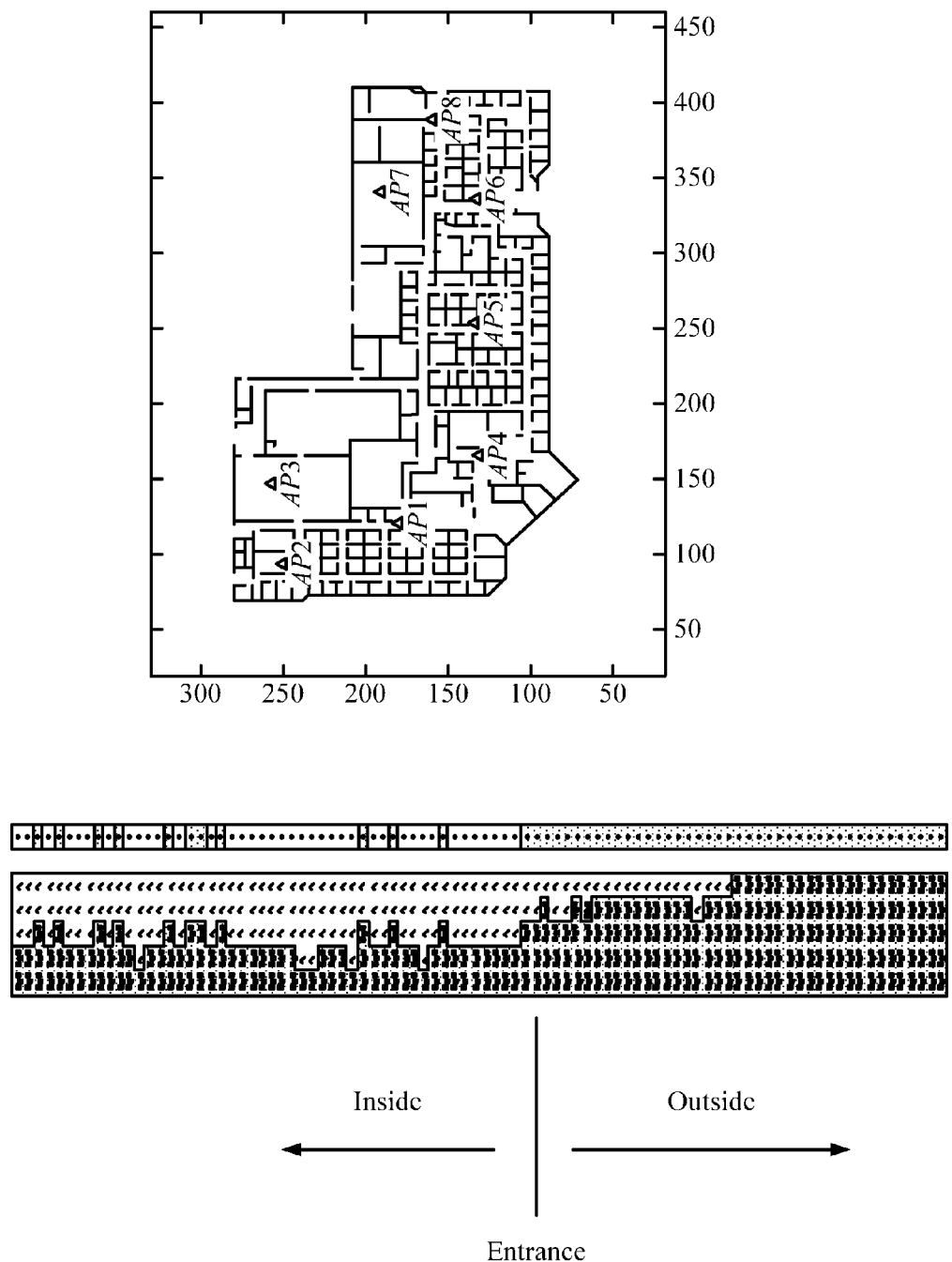

In a particular implementation illustrated in FIG. 5, five possible discrete offsets are identified as −10 dB, −5 dB, 0 dB, +5 dB and +10 dB at times 1 through 5. At time 1, for example, the location of a mobile device may be classified as being in an outdoor region for four out of five possible offsets. An inferred probability or likelihood that the mobile device is in an indoor area may be inferred to be 0.2. By time 4, the location of the mobile device may be classified as being in an outdoor region for three out of five possible offsets. An inferred probability or likelihood that the mobile device is in an indoor area may then raise to 0.4. By time 5, the location of the mobile device may be classified as being in an indoor area for four of five possible offsets. An inferred probability or likelihood that the mobile device is in an indoor area may then raise to 0.8. Here, it may be additionally observed that the increasing inferred probability that the mobile device is in an indoor area may suggest that the location of the mobile device is trending to movement toward an indoor environment from time 1 to time 5. A similar example is illustrated in FIG. 6 in which a map shows interior and exterior regions. An arrow illustrates movement of a mobile device from an indoor portion and transitioning to an outdoor portion. Applying an ensemble prediction algorithm, a location of the mobile device may be predicted to be transitioning away from the indoor region and toward the outdoor region.

Figure 7:
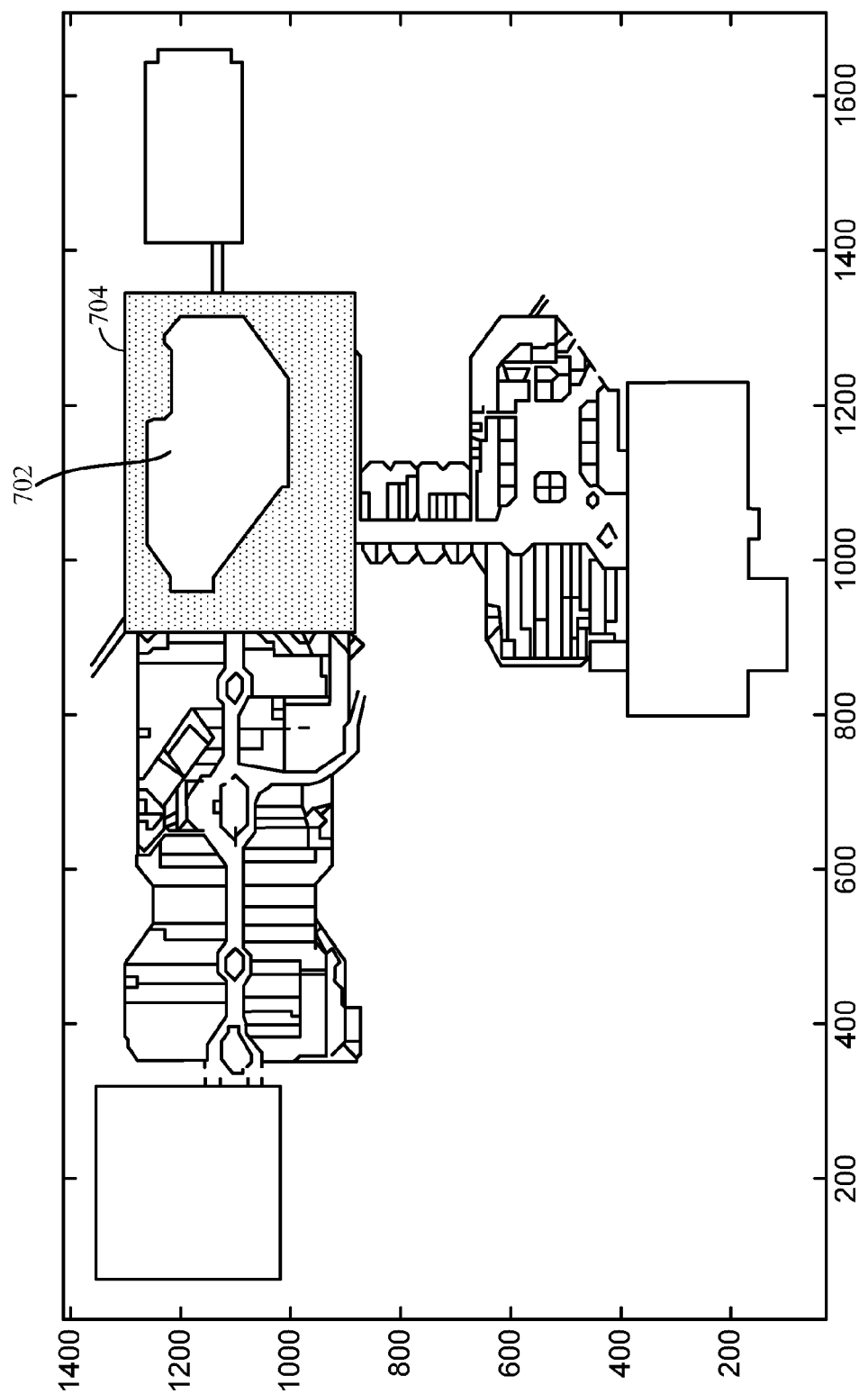
FIG. 7 is a map showing demarcation of an interior area according to an embodiment.

In particular scenarios, positioning performance in an interior portion of a building may behave similar to that of positioning performance in an outdoor region. For example, locations in an interior courtyard, interior well, etc. may be out of range of AP transmissions from other portions of the building. As such, there may not be any reliable heatmap data available for such interior portions. According to an embodiment, training for developing an inference model may rely on heatmap values from only a limited portion of the area covering the building. FIG. 7 is a map of the interior of a building including an interior portion 702 wherein an indoor positioning techniques may not perform well. Portion 702 may be separated from portion 704 by demarcating a bounding box. In this particular example, heatmap data covering portion 704 may be isolated (e.g., excluding portions outside of portion 704) for use in training an inference model (e.g., using a naïve Bayes, decision tree or SVM models). Further improvements in accuracy may be achieved by ranking features based, at least in part, on an information gain measure. In a particular example shown in FIG. 8, MAC addresses of multiple APs are ranked from most relevant to least relevant. Attributes may be ranked as top 5, top 10, etc., as shown with corresponding probabilities of making an accurate inference using naïve Bayes (NB) and decision tree (DT) based inference models, with corresponding probabilities of yielding a correct inference.

For a particular LCI, a single set of parameters for an inference model may be inaccurate if a consistent decision boundary is assumed. In a particular implementation, an area covered by an LCI may be partitioned into tiles such that inference models may be trained for particular tiles. For example, tiles may be formed having a particular location as its center. For a particular tile, a classifier may be trained using indoor/outdoor tags on a particular node or gridpoint. In response to receipt of a GNSS position fix and request from a mobile device for parameters of an inference model (e.g., at time 204 in FIG. 2), a server may respond with one or more messages containing one or more parameters indicative of an inference model, a location and size of a tile that is closest to the GNSS position fix. The mobile device may then use the transmitted parameters indicative of the inference model to classify the location of the mobile device as being indoor or outdoor. As the mobile device exits the area covered by the tile, the mobile device may transmit a new request to the server for parameters indicative of an inference model, location and size of another tile.

Figure 9:
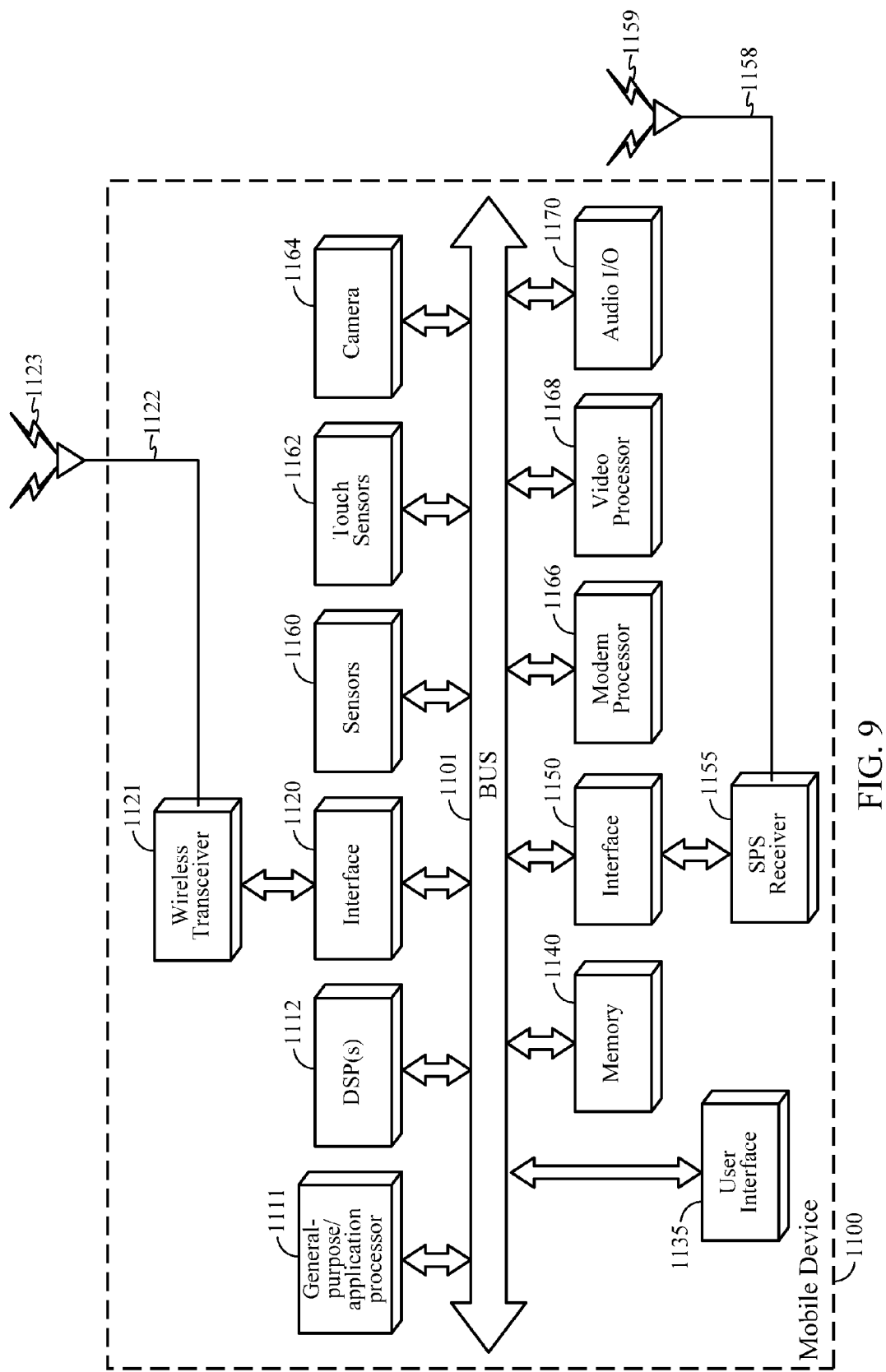
FIG. 9 is a schematic block diagram illustrating an exemplary mobile device, in accordance with an implementation.

FIG. 9 is a schematic diagram of a mobile device according to an embodiment. Mobile device 100 (FIG. 1) may comprise one or more features of mobile device 1100 shown in FIG. 9. In certain embodiments, mobile device 1100 may also comprise a wireless transceiver 1121 which is capable of transmitting and receiving wireless signals 1123 via an antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, WiFi, CDMA, WCDMA, LTE and Bluetooth®, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) 1112 or general purpose/application processor 1111 in support of one or more applications such as, for example, applications directed to positioning or navigation operations. For example, DSP(s) 1112 or general purpose/application processor 1111 may be capable of performing all or a portion of actions of the process indicated in block 306 of FIG. 3.

In a particular implementation, mobile device 1100 may comprise a dedicated modem processor 1166 capable of performing baseband processing of signals received and down-converted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect. Also, wireless transceiver 1121, in combination with modem processor 1166 and/or general purpose/application processor 1111 or DSP(s) 1112 may perform actions set forth at blocks 302, 304, 308 or 310 of FIG. 3.

Figure 10:
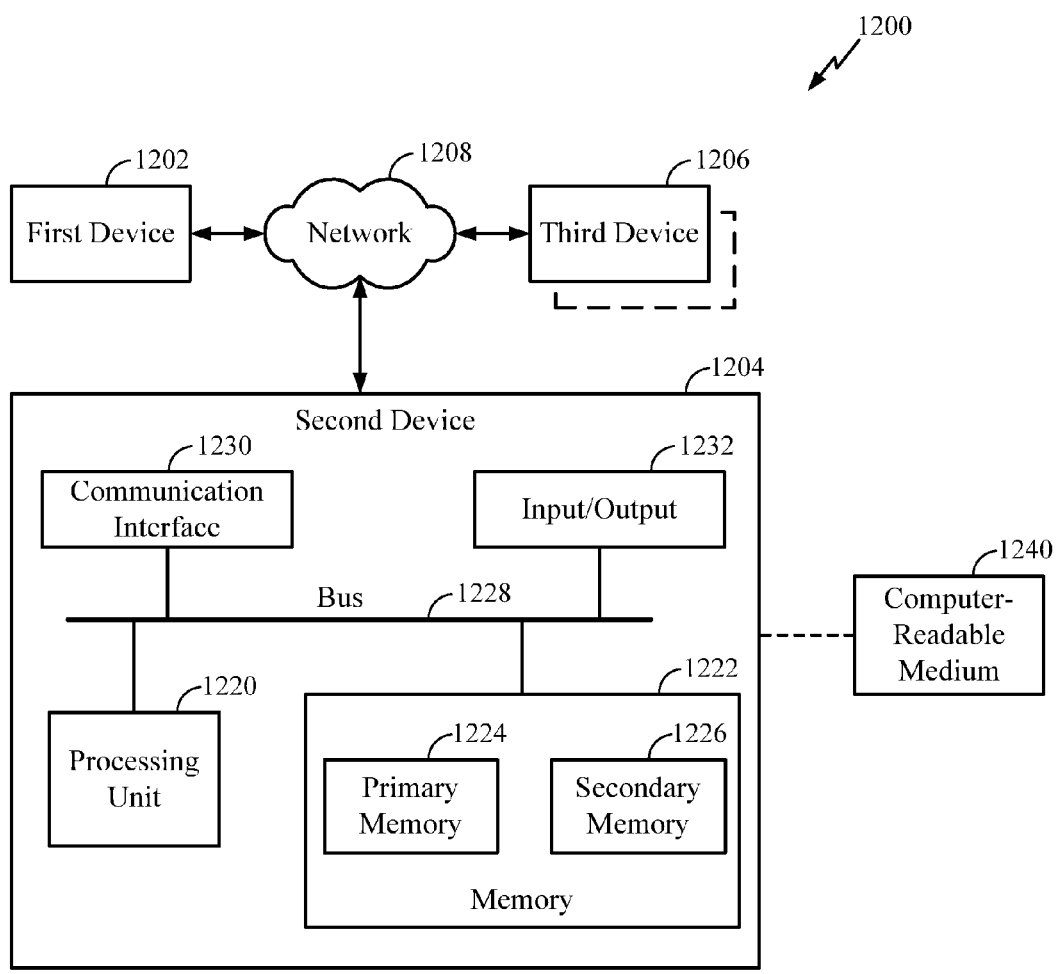
FIG. 10 is a schematic block diagram of an example computing platform in accordance with an implementation.

FIG. 10 is a schematic diagram illustrating an example system 1200 that may include one or more devices configurable to implement techniques or processes described above, for example, in connection with FIG. 1 (e.g., including servers 140, 145 and 150). System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. First device 1202 may also comprise a server capable of providing an LCI to a requesting mobile device based, at least in part, on a rough estimate of a location of the requesting mobile device. First device 1202 may also comprise a server capable of providing indoor positioning assistance data relevant to a location of an LCI specified in a request from a mobile device. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 10, may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Figure 8:
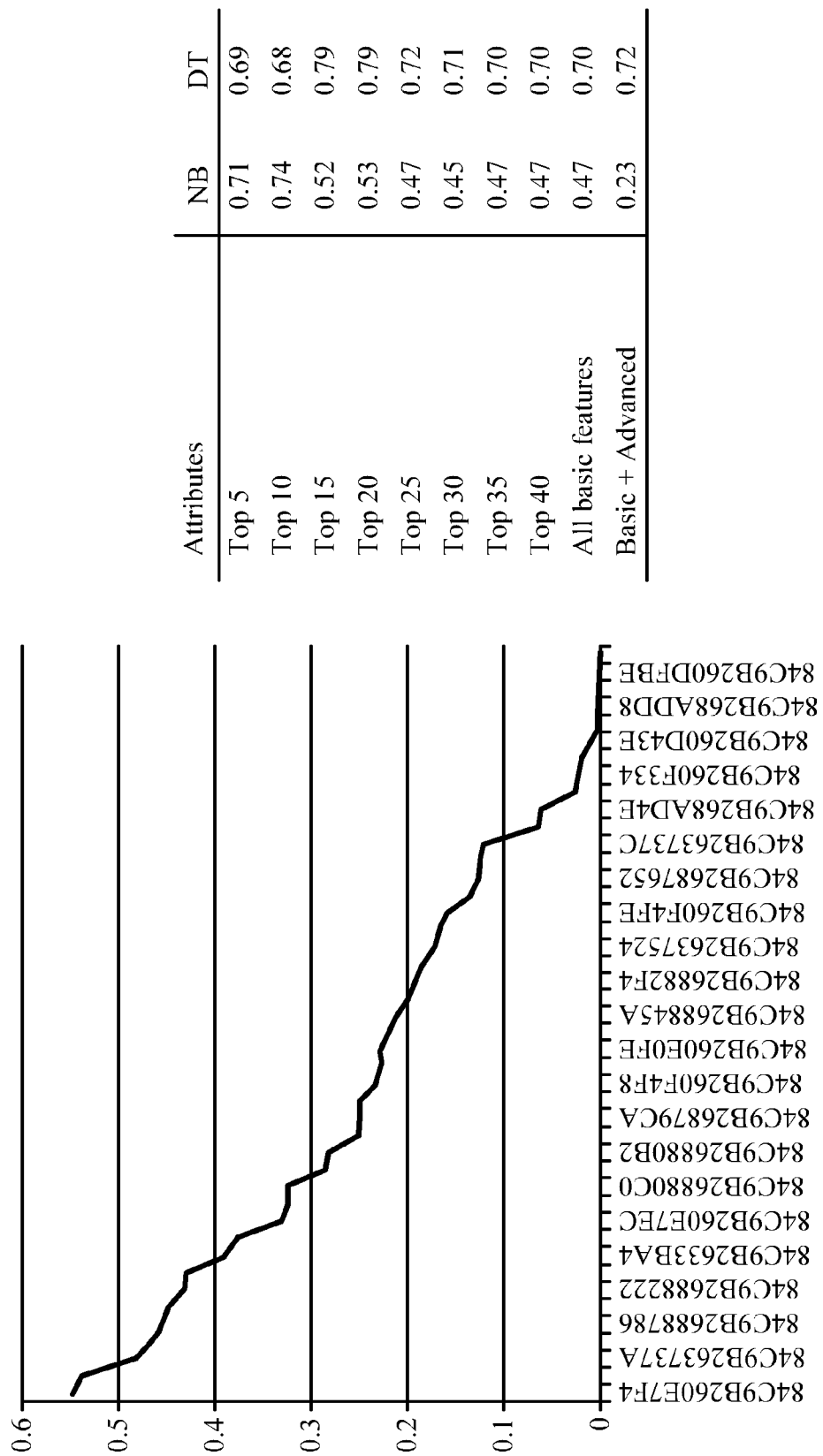
FIG. 8 comprises a table and a plot for analyzing classification attributes according to an embodiment.

Similarly, wireless communications network 1208, as shown in FIG. 8, is representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220. In a particular implementation, processing unit 1220 may execute machine-readable instructions stored on memory 1224 to perform one or more of the actions set forth in FIG. 4 discussed above.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more mobile devices may communicate with a femto cell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
transmitting one or more indicators of a location of the mobile device to a server;
receiving from said server parameters representing an inference model based, at least in part, on the one or more indicators of said location;
determining that said mobile device is located in or approaching a particular region of a plurality of candidate regions based, at least in part, on application of one or more observations obtained by said mobile device to said parameters representing said inference model, wherein the plurality of candidate regions comprise at least one indoor region and at least one outdoor region;
transmitting a request message to said server indicating that said mobile device is located in or approaching the particular region; and
receiving from said server positioning assistance data determined based, at least in part, on said request message.

2. The method of claim 1, wherein said parameters representing said inference model comprises one or more locations of transmitter devices, and wherein at least one of said observations comprises a measurement of received signal strength of a signal transmitted by at least one of said transmitter devices and acquired at said mobile device.

3. The method of claim 1, and further comprising:
attempting to acquire one or more satellite positioning system (SPS) signals if said mobile device is determined to be located in or approaching a first region of said plurality of regions; and
attempting indoor positioning operations if said mobile device is determined to be located in or approaching a second region of said plurality of regions different from said first region.

4. The method of claim 1, wherein said one or more observations comprise received signal strength indication (RSSI) measurements of signals acquired from wireless transmitters, and wherein said one or more parameters representing said inference model comprise:
parameters characterizing whether said mobile device is located in or approaching a particular region based, at least in part, on application of associated thresholds to comparisons of said RSSI measurements with associated expected RSSI signature values, and wherein said method further comprises:
incrementally varying an offset for application to said RSSI measurements in determining said comparisons; and
determining said location of said mobile device as being in said indoor area or said outdoor area based, at least in part, on a number of comparisons exceeding threshold values associated with said RSSI values.

5. The method of claim 1, wherein said particular region is an indoor region or an outdoor region.

6. The method of claim 1, wherein the plurality of candidate regions comprise regions associated with location context identifiers (LCIs), and wherein said particular region comprises a region associated with a particular one of said LCIs.

7. The method of claim 6, wherein received positioning assistance data comprises positioning assistance data for the region associated with the particular one of said LCIs.

8. The method of claim 1, wherein said parameters representing the inference model are formed based, at least in part, on features extracted from a radio heatmap of expected signature values associated with discrete locations.

9. A mobile device comprising:
a wireless transceiver device to wirelessly transmit messages to and wirelessly receive messages from a wireless communication network; and
one or more processors configured to:
initiate transmission of one or more messages through said wireless transceiver device comprising one or more indicators of a location of the mobile device to a server;
obtain one or more messages received from said server at said transceiver device comprising parameters representing an inference model based, at least in part, on the one or more indicators of said location;
determine that said mobile device is located in or approaching a particular region of a plurality of candidate regions based, at least in part, on application of one or more observations obtained by said mobile device to said parameters representing said inference model, wherein the plurality of candidate regions comprise at least one indoor region and at least one outdoor region;
initiate transmission of a request message through said transceiver device to said server indicating that said mobile device is located in or approaching the particular region; and
obtain one or more messages received from said server at said transceiver device comprising positioning assistance data determined based, at least in part, on said request message.

10. The mobile device of claim 9, wherein said particular region is an indoor region or an outdoor region.

11. The mobile device of claim 9, wherein the plurality of candidate regions comprise regions associated with location context identifiers (LCIs), and wherein said particular region comprises a region associated with a particular one of said LCIs.

12. The mobile device of claim 11, wherein received positioning assistance data comprises positioning assistance data for the region associated with the particular one of said LCIs.

13. The mobile device of claim 9, wherein said parameters indicative of the inference model are formed based, at least in part, on features extracted from a radio heatmap of expected signature values associated with discrete locations.

14. An article comprising:
a non-transitory storage medium comprising machine-readable instructions stored thereon which are executable by one or more processors to:
initiate transmission of one or more messages comprising one or more indicators of a location of the mobile device to a server;
obtain one or more messages from said server received at said wireless transceiver device comprising parameters representing an inference model based, at least in part, on the one or more indicators of said location;
determined that said mobile device is located in or approaching a particular region of a plurality of candidate regions based, at least in part, on application of one or more observations obtained by said mobile device to said parameters representing said inference model, wherein the plurality of candidate regions comprise at least one indoor region and at least one outdoor region;
initiate transmission of a request message to said server indicating that said mobile device is located in or approaching the particular region; and obtain one or more messages from said server at said wireless transceiver device comprising positioning assistance data determined based, at least in part, on said request message.

15. The article of claim 14, wherein said parameters representing said inference model comprises one or more locations of transmitter devices, and wherein at least one of said observations comprises a measurement of received signal strength of a signal transmitted by at least one of said transmitter devices and acquired at said mobile device.

16. The article of claim 14, wherein said instructions are further executable by said one or more processors to:
attempt to acquire one or more SPS signals if said mobile device is inferred to be located in a first region of said plurality of regions; and
attempt indoor positioning operations if said mobile device is inferred to be located in a second region of said plurality of regions different from said first region.

17. The article of claim 14, wherein said one or more observations comprise received signal strength indication (RSSI) measurements of signals acquired from wireless transmitters, and wherein said parameters representing said inference model comprise:
parameters characterizing whether said mobile device is located in a particular region based, at least in part, on application of associated thresholds to comparisons of said RSSI measurements with associated expected RSSI signature values, and wherein said instructions are further executable to by said one or more processors to:
incrementally vary an offset for application to said RSSI measurements in determining said comparisons; and
infer said location of said mobile device as being in said indoor area or said outdoor area based, at least in part, on a number of comparisons exceeding threshold values associated with said RSSI values.

18. A mobile device:
means for transmitting one or more indicators of a location of the mobile device to a server;
means for receiving from said server parameters representing an inference model based, at least in part, on the one or more indicators of said location;
means for determining that said mobile device is located in or approaching a particular region of a plurality of candidate regions based, at least in part, on application of one or more observations obtained by said mobile device to said parameters representing said inference model, wherein the plurality of candidate regions comprise at least one indoor region and at least one outdoor region;
means for transmitting a request message to said server indicating that said mobile device is located in or approaching the particular region; and
means for receiving from said server positioning assistance data determined based, at least in part, on said request message.

19. The mobile device of claim 18, wherein said parameters representing said inference model comprise one or more locations of transmitter devices, and wherein at least one of said observations comprises a measurement of received signal strength of a signal transmitted by at least one of said transmitter devices and acquired at said mobile device.

20. The mobile device of claim 18, and further comprising:
means for attempting to acquire one or more satellite positioning system (SPS) signals if said mobile device is determined to be located in or approaching a first region of said plurality of regions; and
means for attempting indoor positioning operations if said mobile device is determined to be located in or approaching a second region of said plurality of regions different from said first region.

21. The mobile device of claim 18, wherein said one or more observations comprise received signal strength indication (RSSI) measurements of signals acquired from wireless transmitters, and wherein said parameters representing said inference model comprise:
parameters characterizing whether said mobile device is located in or approaching a particular region based, at least in part, on application of associated thresholds to comparisons of said RSSI measurements with associated expected RSSI signature values, and wherein said mobile device further comprises:
means for incrementally varying an offset for application to said RSSI measurements in determining said comparisons; and
means for determining said location of said mobile device as being in said indoor area or said outdoor area based, at least in part, on a number of comparisons exceeding threshold values associated with said RSSI values.

22. The mobile device of claim 18, wherein said particular region is an indoor region or an outdoor region.

23. The mobile device of claim 18, wherein the plurality of candidate regions comprise regions associated with location context identifiers (LCIs), and wherein said particular region comprises a region associated with a particular one of said LCIs.

24. The mobile device of claim 23, wherein received positioning assistance data comprises positioning assistance data for the region associated with the particular one of said LCIs.

25. The mobile device of claim 18, wherein said parameters representing the inference model are formed based, at least in part, on features extracted from a radio heatmap of expected signature values associated with discrete locations.

* * * * *